(12) United States Patent
Lee et al.

(10) Patent No.: US 8,396,412 B2
(45) Date of Patent: Mar. 12, 2013

(54) MOBILE TERMINAL AND BROADCAST CONTROLLING METHOD THEREOF

(75) Inventors: Sang Hoon Lee, Seoul (KR); Youn Sik Kim, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 595 days.

(21) Appl. No.: 12/640,358

(22) Filed: Dec. 17, 2009

(65) Prior Publication Data

US 2010/0267409 A1 Oct. 21, 2010

(30) Foreign Application Priority Data

Apr. 21, 2009 (KR) ........................ 10-2009-0034542

(51) Int. Cl.
*H04N 20/74* (2006.01)
(52) U.S. Cl. .................. 455/3.02; 455/135; 455/566
(58) Field of Classification Search ............... 455/3.02, 455/133–135, 150.1, 151.1, 154.1, 154.2, 455/550.1, 552.1, 553.1
See application file for complete search history.

(56) References Cited

U.S. PATENT DOCUMENTS

| | | | |
|---|---|---|---|
| 7,212,781 B2 * | 5/2007 | Hikomoto | 455/3.01 |
| 7,953,381 B2 * | 5/2011 | Suzuki | 455/132 |
| 2005/0153650 A1 | 7/2005 | Hikomoto | |
| 2008/0066115 A1 | 3/2008 | Burckard | |
| 2008/0139109 A1 | 6/2008 | Ewertz | |
| 2008/0172441 A1 | 7/2008 | Speicher | |

FOREIGN PATENT DOCUMENTS

| | | |
|---|---|---|
| JP | 2004-40380 | 5/2004 |
| WO | WO 01/45308 | 6/2001 |

OTHER PUBLICATIONS

European Search Report for Application No. 10160516.0-2202 dated Aug. 24, 2010.

* cited by examiner

*Primary Examiner* — Nhan Le
(74) *Attorney, Agent, or Firm* — KED & Associates, LLP

(57) ABSTRACT

A mobile terminal is provided having a memory, a display, a wireless communication unit having a first module to receive a first broadcast signal and a second module to receive a second broadcast signal, and a controller to control the wireless communication unit, wherein when a signal strength of the first broadcast signal received by the first module is less than a first signal strength, the controller to control the second module to receive the second broadcast signal and the second broadcast signal is buffered in the memory while the display displays content corresponding to the first broadcast signal received by the first module.

23 Claims, 14 Drawing Sheets

MOBILE TERMINAL AND BROADCAST CONTROLLING METHOD THEREOF

This application claims priority and benefit from Korean Application No. 10-2009-0034542, filed Apr. 21, 2009, the subject matter of which is hereby incorporated by reference.

BACKGROUND

1. Field

Embodiments of the present disclosure may relate to a mobile terminal and a method of controlling a broadcast therein.

2. Background

A mobile terminal may perform various functions. Examples of such functions may include data and voice communications, capturing images and video via a camera, recording audio, playing music files via a speaker system, and displaying images and video on a display. Terminals may include additional functionality that supports game playing, while other terminals may be configured as multimedia players. Mobile terminals may be configured to receive broadcast and multicast signals that permit viewing of content such as videos and television programs.

SUMMARY OF THIS INVENTION

Object of the present invention is to provide a mobile terminal and a method of controlling a broadcast therein, by which a currently viewed broadcast content can be seamlessly provided by buffering a broadcast signal corresponding to another broadcast mode when a broadcast signal strength of one broadcast mode becomes poorer than a predetermined reference or a broadcast signal strength of another broadcast mode becomes better than a predetermined reference, in the course of outputting a broadcast signal using one broadcast mode.

A mobile terminal may include a wireless communication unit configured to receive a broadcast signal, an output unit outputting the broadcast signal received by the wireless communication unit, and a controller. When a signal strength of a first broadcast signal currently outputted by the output unit in correspondence to a first broadcast mode is less than a first reference, the controller controls the wireless communication unit to receive a second broadcast signal corresponding to the first broadcast signal as a broadcast signal corresponding to a second broadcast mode, and the controller controls the received second broadcast signal to be buffered.

A mobile terminal may include a wireless communication unit configured to receive a broadcast signal, an output unit outputting the broadcast signal received by the wireless communication unit, and a controller measuring a signal strength of a first broadcast signal and a signal strength of a second broadcast signal corresponding to the first broadcast signal as a broadcast signal corresponding to a second broadcast mode in a course of outputting the first broadcast signal corresponding to a first broadcast mode via the output unit. If the signal strength of the second broadcast signal is greater than the signal strength of the first broadcast signal as a result of the measurement, the controller may receive and buffer the second broadcast signal.

A method of controlling a broadcast in a mobile terminal may include receiving and outputting a first broadcast signal corresponding to a first broadcast mode, determining whether a signal strength of the first broadcast signal is less than a first reference, and if the signal strength of the first broadcast signal is less than the first reference, receiving and buffering a second broadcast signal corresponding to the first broadcast signal as the broadcast signal corresponding to a second broadcast mode.

A method of controlling a broadcast in a mobile terminal may include receiving and outputting a first broadcast signal corresponding to a first broadcast mode, measuring a signal strength of the first broadcast signal and a signal strength of a second broadcast signal corresponding to the first broadcast signal as a broadcast signal corresponding to a second broadcast mode. Additionally, if the signal strength of the second broadcast signal is greater than the signal strength of the first broadcast signal as a result of the measuring, the method may also include receiving and buffering the second broadcast signal.

BRIEF DESCRIPTION OF THE DRAWINGS

Arrangements and embodiments may be described in detail with reference to the following drawings in which like reference numerals refer to like elements and wherein.

DETAILED DESCRIPTION

Mobile terminals may include a mobile phone, a smart phone, a laptop computer, a digital broadcast terminal, a PDA (personal digital assistants), a PMP (portable multimedia player), a navigation system and/or the like. Embodiments may also be applicable to stationary terminals such as a digital TV, a desktop computer and/or the like.

Figure 1:
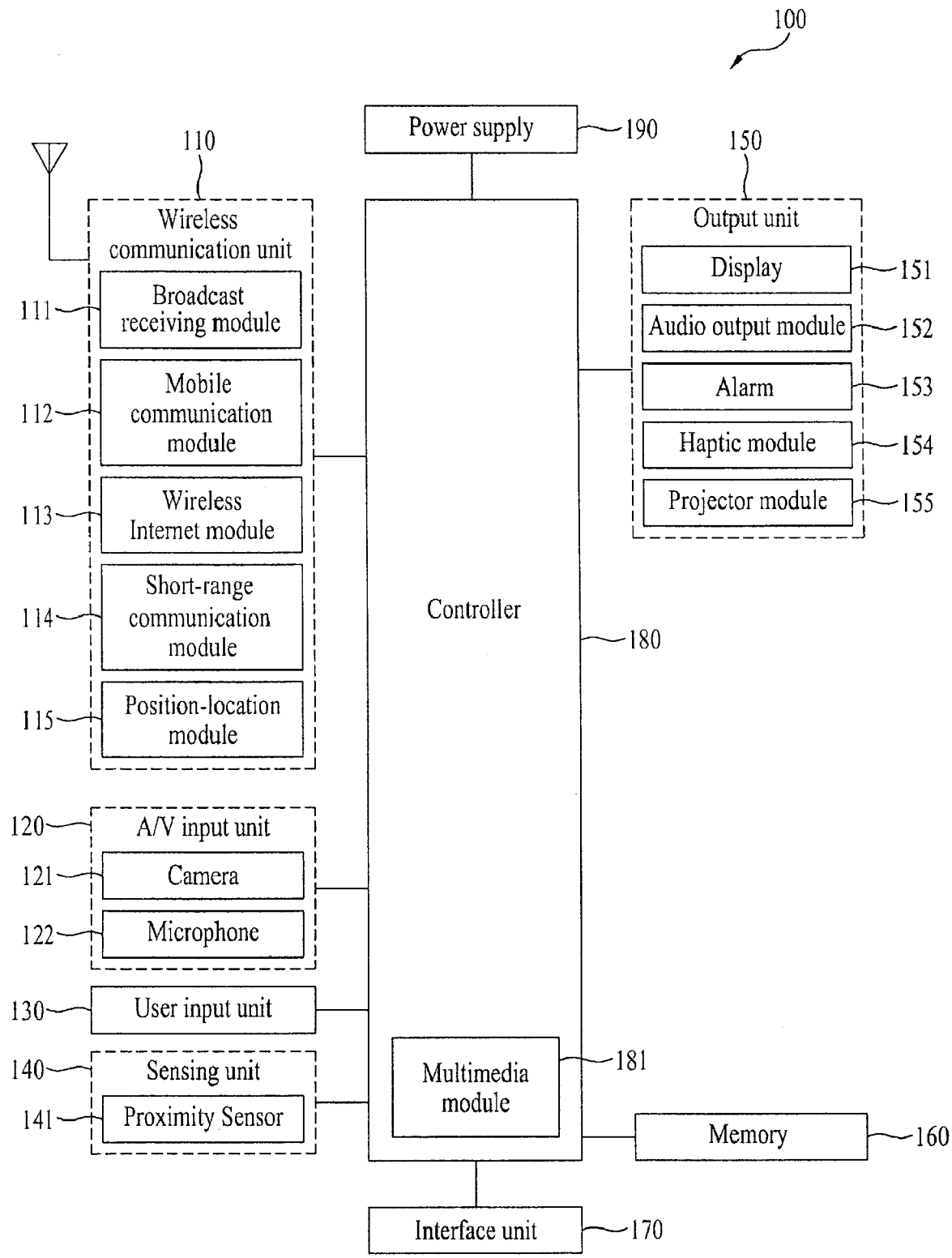
FIG. 1 is a block diagram of a mobile terminal according to one example embodiment.

FIG. 1 is a block diagram of a mobile terminal according to one example embodiment. Other embodiments, configurations and arrangements may also be provided. A mobile terminal 100 may include a wireless communication unit 110, an A/V (audio/video) input unit 120, a user input unit 130, a sensing unit 140, an output unit 150, a memory 160, an interface unit 170, a controller 180, a power supply 190 and the like. FIG. 1 shows the mobile terminal 100 having various components, although it is understood that implementing all of the illustrated components is not a requirement. Greater or fewer components may alternatively be implemented.

The wireless communication unit 110 may include one or more components that permits wireless communication between the mobile terminal 100 and a wireless communication system or network within which the mobile terminal 100 is located. For example, the wireless communication unit 110 may include a broadcast receiving module 111, a mobile communication module 112, a wireless Internet module 113, a short-range communication module 114, a position-location module 115 and the like.

The broadcast receiving module 111 may receive a broadcast signal and/or broadcast associated information from an external broadcast managing server via a broadcast channel. The broadcast channel may include a satellite channel and a terrestrial channel.

The broadcast managing server may refer to a server that generates and transmits a broadcast signal and/or broadcast associated information or a server that is provided with a previously generated broadcast signal and/or broadcast associated information and then transmits the provided signal or information to a terminal. The broadcast signal may be implemented as a TV broadcast signal, a radio broadcast signal, and a data broadcast signal, for example. If desired, the broadcast signal may further include a broadcast signal combined with a TV or radio broadcast signal.

The broadcast associated information includes information associated with a broadcast channel, a broadcast program, a broadcast service provider, etc. The broadcast associated information may be provided via a mobile communication network. The broadcast associated information may be received by the mobile communication module 112.

The broadcast associated information may be implemented in various forms. For example, broadcast associated information may include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. Such broadcasting systems may include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). The broadcast receiving module 111 may be suitable for other broadcasting systems as well as the above-described digital broadcasting systems.

The broadcast signal and/or broadcast associated information received by the broadcast receiving module 111 may be stored in a suitable device, such as the memory 160.

The mobile communication module 112 may transmit/receive wireless signals to/from one or more network entities (e.g., a base station, an external terminal, a server, etc.). Such wireless signals may represent audio, video, and data according to text/multimedia message transceivings, for example.

The wireless Internet module 113 may support Internet access for the mobile terminal 100. The wireless Internet module 113 may be internally or externally coupled to the mobile terminal 100. The wireless Internet technology may include WLAN (Wireless LAN) (Wi-Fi), Wibro (Wireless broadband), Wimax (World Interoperability for Microwave Access), HSDPA (High Speed Downlink Packet Access), etc.

The short-range communication module 114 may facilitate relatively short-range communications. Suitable technologies for implementing this module may include radio frequency identification (RFID), infrared data association (IrDA), ultra-wideband (UWB), as well at networking technologies referred to as Bluetooth and ZigBee, for example.

The position-location module 115 may identify or otherwise obtain the location or position of the mobile terminal 100. The position-location module 115 may be implemented with a global positioning system (GPS) module.

The audio/video (A/V) input unit 120 may provide audio or video signal input to the mobile terminal 100. As shown, the A/V input unit 120 may include a camera 121 and a microphone 122. The camera 121 may receive and process image frames of still pictures or video that are obtained by an image sensor in a video call mode or a photographing mode. The processed image frames may be displayed on a display 151 (or display unit).

The image frames processed by the camera 121 can be stored in the memory 160 or can be externally transmitted via the wireless communication unit 110. At least two cameras 121 can be provided to the mobile terminal 100 according to environment of usage.

The microphone 122 may receive an external audio signal while the portable device is in a particular mode, such as a phone call mode, a recording mode and a voice recognition mode. This audio signal may be processed and converted into electric audio data. The processed audio data may be transformed into a format transmittable to a mobile communication base station via the mobile communication module 112 in case of a call mode. The microphone 122 may include assorted noise removing algorithms (or noise cancelling algorithms) to remove (or reduce) noise generated in the course of receiving the external audio signal.

The user input unit 130 may generate input data responsive to user manipulation of an associated input device or devices. Examples of such devices include keypad, a dome switch, a touchpad (e.g., static pressure/capacitance), a jog wheel, a jog switch, etc.

The sensing unit 140 may provide sensing signals for controlling operations of the mobile terminal 100 using status measurements of various aspects of the mobile terminal 100. For example, the sensing unit 140 may detect an open/close status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, the mobile terminal 100 is configured as a slide-type mobile terminal. In this configuration, the sensing unit 140 may sense whether a sliding portion of the mobile terminal 100 is open or closed. Other examples include the sensing unit 140 sensing presence or absence of power provided by the power supply 190, presence or absence of a coupling or other connection between the interface unit 170 and an external device. The sensing unit 140 can include a proximity sensor 141.

The output unit 150 may generate outputs relevant to senses of sight, hearing, touch and/or the like. The output unit 150 may include the display 151, an audio output module 152, an alarm 153, a haptic module 154, a projector module 155 and the like.

The display 151 may be implemented to visually display (output) information associated with the mobile terminal 100. For example, if the mobile terminal 100 is operating in a phone call mode, the display 151 may provide a user interface (UI) or a graphical user interface (GUI) that which includes information associated with placing, conducting, and/or terminating a phone call. As another example, if the mobile terminal 100 is in a video call mode or a photographing mode, the display 151 may additionally or alternatively display images that are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays may be implemented in a transparent or optical transmittive type that can be called a transparent display. As a representative example of the transparent display, a transparent OLED (TOLED) may be used. A rear configuration of the display 151 can be implemented as the optical transmittive type as well. In this configuration, a user may see an object in rear of a terminal body via the area occupied by the display 151 of the terminal body.

At least two displays 151 may be provided on the mobile terminal 100 in accordance with the implemented configuration of the mobile terminal 100. For example, a plurality of displays (or display units) can be arranged on a single face of the mobile terminal 100 in a manner of being spaced apart from each other or being built in one body. Alternatively, a plurality of displays (or display units) can be arranged on different faces of the mobile terminal 100.

In case that the display 151 and a sensor for detecting a touch action (hereafter a touch sensor) configures a mutual layer structure (hereafter a touchscreen), it is able to use the display 151 as an input device as well as an output device. In this example, the touch sensor can be configured as a touch film, a touch sheet, a touchpad and/or the like.

The touch sensor can be configured to convert a pressure applied to a specific portion of the display 151 or a variation of a capacitance generated from a specific portion of the display 151 to an electric input signal. Moreover, the touch sensor may detect a pressure of a touch as well as a touched position or size.

If a touch input is made to the touch sensor, signal(s) corresponding to the touch is transferred to a touch controller. The touch controller may process the signal(s) and then transfer the processed signal(s) to the controller 180. Therefore, the controller 180 may know whether a prescribed portion of the display 151 is touched.

The proximity sensor 141 may be provided at an internal area of the mobile terminal 100 enclosed by the touchscreen or around the touchscreen. The proximity sensor 141 is a sensor that detects a presence or non-presence of an object approaching a prescribed detecting surface or an object existing around the proximity sensor 141 using an electromagnetic field strength or infrared ray without mechanical contact. The proximity sensor 141 may have a durability longer than a contact type sensor and may also have a utility wider than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. In case that the touchscreen includes the electrostatic capacity proximity sensor, it may detect the proximity of a pointer using a variation of electric field according to the proximity of the pointer. In this example, the touchscreen (touch sensor) can be classified as the proximity sensor.

In the following description, an action that a pointer approaches without contacting the touchscreen may be called a proximity touch. An action that a pointer actually touches the touchscreen may be called a contact touch. The meaning of the position on the touchscreen proximity-touched by the pointer may mean the position of the pointer that vertically opposes the touchscreen when the pointer performs the proximity touch.

The proximity sensor 141 may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touchscreen.

The audio output module 152 may function in various modes including a call-receiving mode, a call-placing mode, a recording mode, a voice recognition mode, a broadcast reception mode and/or the like to output audio data that is received from the wireless communication unit 110 or is stored in the memory 160. During operation, the audio output module 152 may output audio relating to a particular function (e.g., a call received, a message received, etc.). The audio output module 152 may be implemented using one or more speakers, buzzers, other audio producing devices, and/or combinations thereof.

The alarm 153 (or alarm unit) may output a signal announcing an occurrence of a particular event associated with the mobile terminal 100. The events include a call received event, a message received event and a touch input received event. The alarm 153 may output a signal for announcing the event occurrence by way of vibration as well as video or audio signal. The video or audio signal can be outputted via the display 151 or the audio output unit 152. The display 151 or the audio output module 152 can be regarded as a part of the alarm 153.

The haptic module 154 may generate various tactile effects that can be sensed by a user. Vibration may be a representative one of the tactile effects generated by the haptic module 154. Strength and pattern of the vibration generated by the haptic module 154 may be controllable. For example, different vibrations may be outputted by being synthesized together or may be outputted in sequence.

The haptic module 154 may generate various tactile effects as well as the vibration. For example, the haptic module 154 may generate the effect attributed to the arrangement of pins vertically moving against a contact skin surface, the effect attributed to injection/suction power of air though an injection/suction hole, the effect attributed to a skim over a skin surface, the effect attributed to contact with an electrode, the effect attributed to an electrostatic force, the effect attributed to representation of hold/cold sense using an endothermic or exothermic device and/or the like.

The haptic module 154 may enable a user to sense the tactile effect through a muscle sense of finger, arm or the like as well as to transfer the tactile effect through a direct contact. At least two haptic modules 154 can be provided to the mobile terminal 100 in accordance with the corresponding configuration type of the mobile terminal 100.

The projector module 155 may perform an image projector function using the mobile terminal 100. The projector module 155 may display an image that is identical to or partially different from the image displayed on the display 151, on an external screen or wall according to a control signal of the controller 180.

The projector module 155 may include a light source (not shown) that generates light (e.g., a laser) for projecting an image externally, an image producing means (not shown) for producing an image to externally output using light generated from the light source, and a lens (not shown) for enlarging to externally output the image at a predetermined focus distance. The projector module 155 may further include a device (not shown) for adjusting an image projected direction by mechanically moving a lens or the whole module.

The projector module 155 may be classified as a cathode ray tube (CRT) module, a liquid crystal display (LCD) module, a digital light processing (DLP) module or the like according to a device type of a display means. The DLP module may operate by a mechanism of enabling light generated from the light source to reflect on a digital micromirror device (DMD) chip and may be advantageous for downsizing of the projector module 151.

The projector module 155 may be provided in a length direction of a lateral, front or backside direction of the mobile terminal 100. The projector module 155 may be provided on any portion of the mobile terminal 100 according to necessity.

The memory 160 may be used to store various types of data to support processing, control, and storage requirements of the mobile terminal 100. Examples of such data include program instructions for applications operating on the mobile terminal 100, contact data, phonebook data, messages, audio, still pictures, moving pictures, etc. A recent use history or a cumulative use frequency of each data (e.g., use frequency for each phonebook, each message or each multimedia) can be stored in the memory 160. Data for various patterns of vibration and/or sound outputted in case of a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), and/or other similar memory or data storage device. The mobile terminal 100 may operate in association with a web storage for performing a storage function of the memory 160 on the Internet.

The interface unit 170 may couple the mobile terminal 100 with external devices. The interface unit 170 may receive data from the external devices or may be supplied with power and then transfer the data or power to the respective elements of the mobile terminal 100 or enable data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be chip for storing various kinds of information for authenticating a use authority of the mobile terminal 100 and may include a User Identify Module (UIM), a Subscriber identify Module (SIM), a Universal Subscriber Identity Module (USIM) and/or the like. A device having the identity module (hereafter an identity device) may be manufactured as a smart card. Therefore, the identity device may be connectible to the mobile terminal 100 via the corresponding port.

When the mobile terminal 110 is connected to an external cradle, the interface unit 170 may become a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 may control overall operations of the mobile terminal 100. For example, the controller 180 may perform the control and processing associated with voice calls, data communications, video calls, etc. The controller 180 may include a multimedia module 181 that provides multimedia playback. The multimedia module 181 may be configured as part of the controller 180, or may be implemented as a separate component.

The controller 180 may perform a pattern recognizing process for recognizing a writing input and a picture drawing input carried out on the touchscreen as characters or images, respectively.

The power supply 190 may provide power required by the various components for the mobile terminal 100. The power may be internal power, external power, and/or combinations thereof.

Embodiments described herein may be implemented in a computer-readable medium using, for example, computer software, hardware, and/or some combination thereof. For a hardware implementation, embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a selective combination thereof. Such embodiments may also be implemented by the controller 180.

For a software implementation, embodiments described herein may be implemented with separate software modules, such as procedures and functions, each of which may perform one or more of the functions and operations described herein. The software codes can be implemented with a software application written in any suitable programming language and may be stored in memory such as the memory 160, and executed by a controller or processor, such as the controller 180.

Figure 2A:
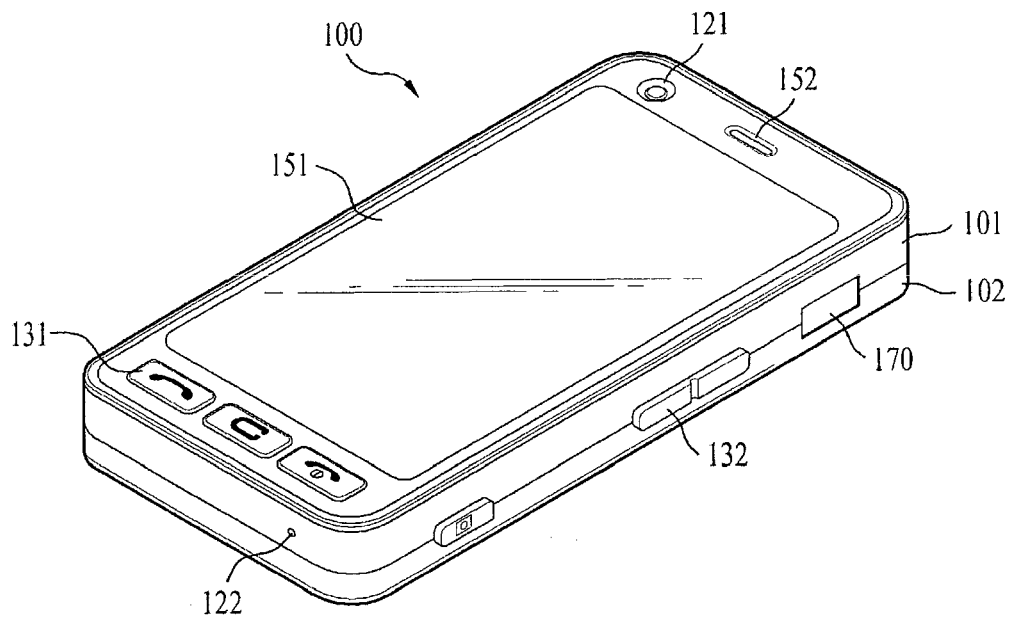
FIG. 2A is a front perspective diagram of a mobile terminal according to one example embodiment.

FIG. 2A is a front perspective diagram of a mobile terminal according to one example embodiment. The mobile terminal 100 may have a bar type terminal body. The mobile terminal 100 may be implemented in a variety of different configurations. Examples of such configurations may include a folder-type, a slide-type, a rotational-type, a swing-type and/or combinations thereof. For clarity, the further disclosure may primarily relate to a bar-type mobile terminal 100. However, such teachings may apply equally to other types of mobile terminals.

The mobile terminal 100 may include a case (e.g. casing, housing, cover, etc.) configuring an exterior thereof. The case can be divided into a front case 101 and a rear case 102. Various electric/electronic parts may be loaded in a space provided between the front case 101 and the rear case 102. At least one middle case may be further provided between the front case 101 and rear case 102.

The front and rear cases 101 and 102 may be formed by injection molding of synthetic resin or may be formed of metal substance such as stainless steel (STS), titanium (Ti) and/or the like, for example. The display 151, the audio output unit 152, the camera 121, the user input unit 130 (including manipulating units 131 and 132), the microphone 122, the interface 180 and the like can be provided on or in the terminal body and more particularly on or in the front case 101.

The display 151 may occupy most of a main face of the front case 101. The audio output unit 151 and the camera 121 may be provided at an area adjacent to one of both end portions of the display 151, while the user input unit 131 and the microphone 122 may be provided to another area adjacent to the other end portion of the display 151. The user input unit 132 and the interface 170 can be provided on lateral sides of the front case 101 and the rear case 102.

The user input unit 130 may receive a command for controlling an operation of the terminal 100. The input unit 130 may include a plurality of manipulating units 131 and 132. The manipulating units 131 and 132 can be called a manipulating portion and may adopt any mechanism of a tactile manner that enables a user to perform a manipulation action by experiencing a tactile feeling.

Content inputted by the first or second manipulating units 131 or 132 can be diversely set. For example, commands such as start, end, scroll and the like may be inputted to the first manipulating unit 131. A command for a volume adjustment of sound outputted from the audio output unit 152, a command for a switching to a touch recognizing mode of the display 151 and/or the like may be inputted to the second manipulating unit 132.

Figure 2B:
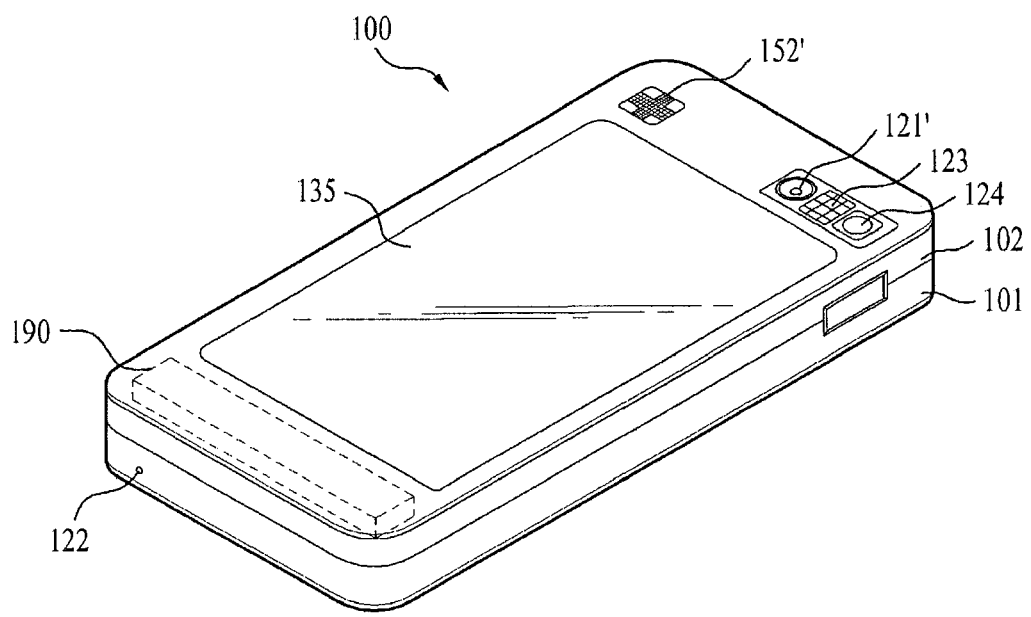
FIG. 2B is a rear perspective diagram of a mobile terminal according to one example embodiment.

FIG. 2B is a perspective diagram of a backside of the terminal shown in FIG. 2A. A camera 121' may be additionally provided on a backside of the terminal body, and more particularly on the rear case 102. The camera 121' may have a photographing direction that is substantially opposite to a photographing direction of the former camera 121 shown in FIG. 2A and may have pixels differing from those of the camera 121.

For example, the camera 121 may have low resolution pixels to capture and transmit a picture of user's face for a video call, while the camera 121' may have higher resolution pixels for capturing a general subject for photography without transmitting the captured subject. Each of the cameras 121 and 121' may be installed at the terminal body to be rotated or popped up.

A flash 123 and a mirror 124 may be additionally provided adjacent to the camera 121'. The flash 123 may project light toward a subject in case of photographing the subject using the camera 121'. If a user attempts to take a picture of the user (i.e., self-photography) using the camera 121', the mirror 124 may enable the user to view the user's face reflected by the mirror 124.

An additional audio output unit 152' may be provided on the backside of the terminal body. The additional audio output unit 152' may implement a stereo function together with the audio output unit 152 shown in FIG. 2A and may be used to implement a speakerphone mode in talking over the terminal.

A broadcast signal receiving antenna 124 may be additionally provided to the lateral side of the terminal body as well as an antenna for communication or the like. The antenna 124 may be constructed as a portion of the broadcast receiving module 111 and may be retractably provided to the terminal body.

The power supply 190 for supplying a power to the terminal 100 may be provided to the terminal body. The power supply 190 may be configured to be built within the terminal body. The power supply 190 may be detachably connected to the terminal body.

A touchpad 135 for detecting a touch may be additionally provided on the rear case 102. The touchpad 135 may be configured in a light transmittive type like the display 151. If the display 151 is configured to output visual information from both faces, it may also recognize the visual information via the touchpad 135. The information outputted from both of the faces may be entirely controlled by the touchpad 135. A display may be further provided to the touchpad 135 so that a touchscreen can be provided to the rear case 102 as well.

The touchpad 135 may be activated by interconnecting with the display 151 of the front case 101. The touchpad 135 may be provided in rear of the display 151 in parallel. The touchpad 135 can may a size equal to or less than a size of the display 151.

Figure 3:
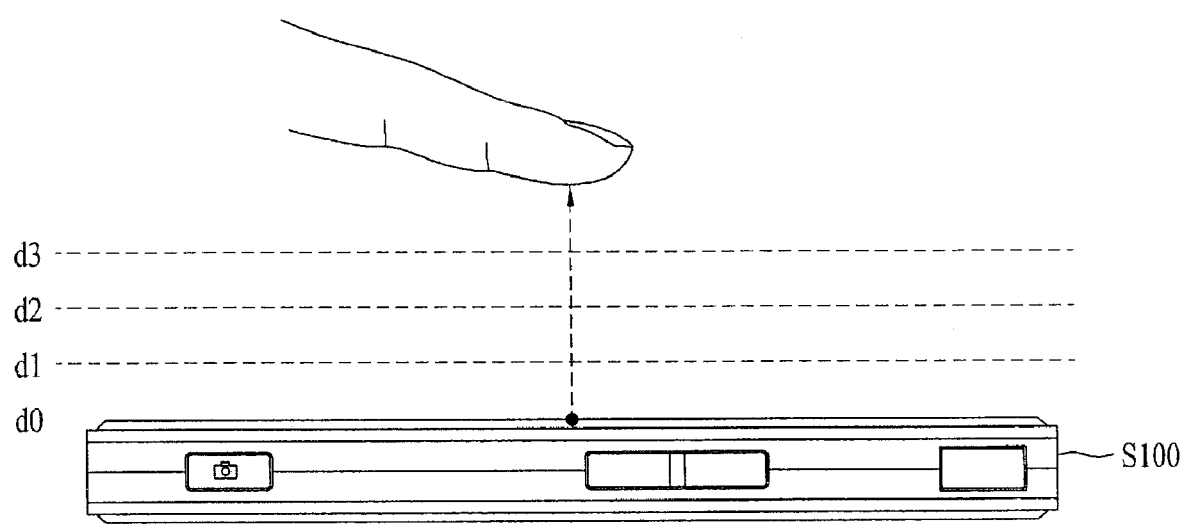
FIG. 3 is a diagram to explain a proximity depth of a proximity sensor.

FIG. 3 is a diagram for explaining a proximity depth of a proximity sensor 141. When a pointer such as a user's finger, a pen and the like approaches the touchscreen, the proximity sensor 141 provided within or in the vicinity of the touchscreen may detect the approach of the pointer and then output a proximity signal. The proximity sensor 141 may output a different proximity signal according to a distance between the pointer and the proximity-touched touchscreen (hereafter a proximity depth).

FIG. 3 shows a cross-section of the touchscreen provided with a proximity sensor capable of three proximity depths, for example. The proximity sensor 141 may be capable of proximity depths of other amounts.

If the pointer is fully contacted with the touchscreen (d0), then it is recognized as a contact touch. If the pointer is spaced apart from the touchscreen at a distance smaller than d1, it is recognized as a proximity touch to a first proximity depth. If the pointer is spaced apart from the touchscreen at a distance between d1 and d2, it is recognized as a proximity touch to a second proximity depth. If the pointer is spaced apart from the touchscreen in a distance less than d3 or equal to or greater than d2, it is recognized as a proximity touch to a third proximity depth. If the pointer is spaced apart from the touchscreen in a distance equal to or greater than d3, it is recognized as a proximity touch that is released.

The controller 180 may recognize the touch as one of various input proximity signals according to the proximity depth and position of the pointer. The controller 180 may perform various operation controls according to the various input signals.

Figure 4A:
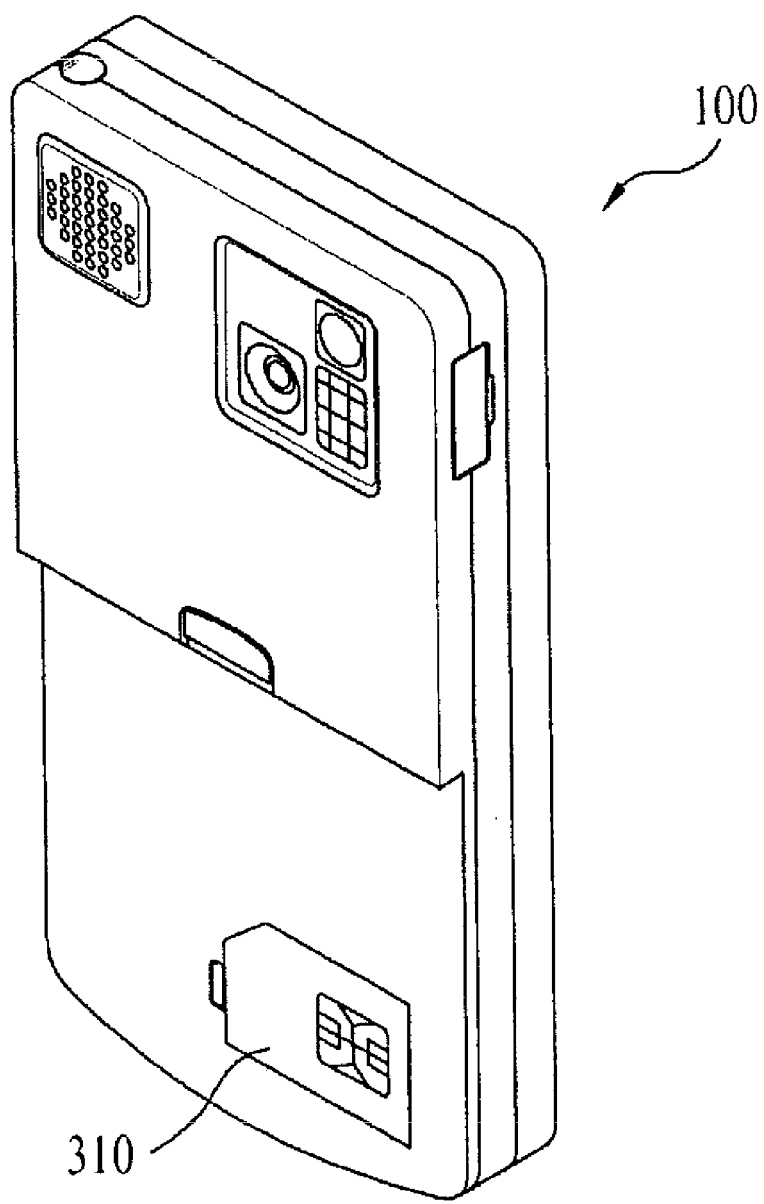
FIG. 4A and FIG. 4B are rear perspective diagrams of a mobile terminal according to one example embodiment in which an identity device is detachably attached to the mobile terminal.
Figure 4B:
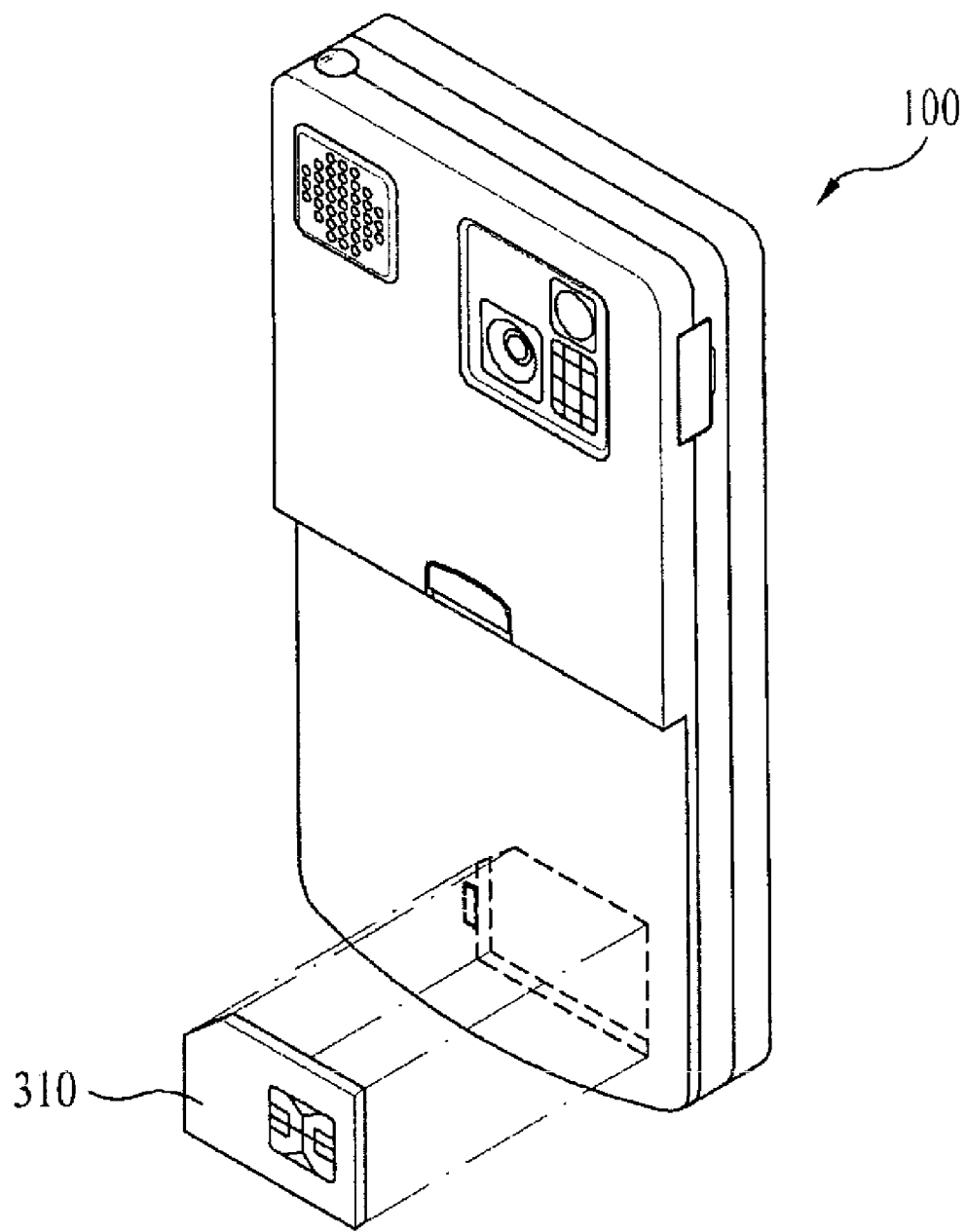

FIG. 4A and FIG. 4B are backside perspective diagrams of a mobile terminal according to one example embodiment in which an identity device is detached/attached to/from the mobile terminal 100. The identity device may include a SIM card, for example.

As shown in FIG. 4A and FIG. 4B, an identity device 310 may be provided that is detachable from the mobile terminal 100. Therefore, an old identity device can be replaced by a new identity device to be loaded in the mobile terminal 100. The identity device 310 may be loaded in the terminal 100 by being combined with the interface unit 170. Alternatively, the identity device 310 may be loaded in the mobile terminal 100 by being connected to a connector separately provided for assembly to the identity device 310.

A connecting device (not shown) for connecting the identity device 310 to the terminal 100 may be provided to any place of the mobile terminal 100 such as a backside, a lateral side, a front side and/or the like.

Figure 5:
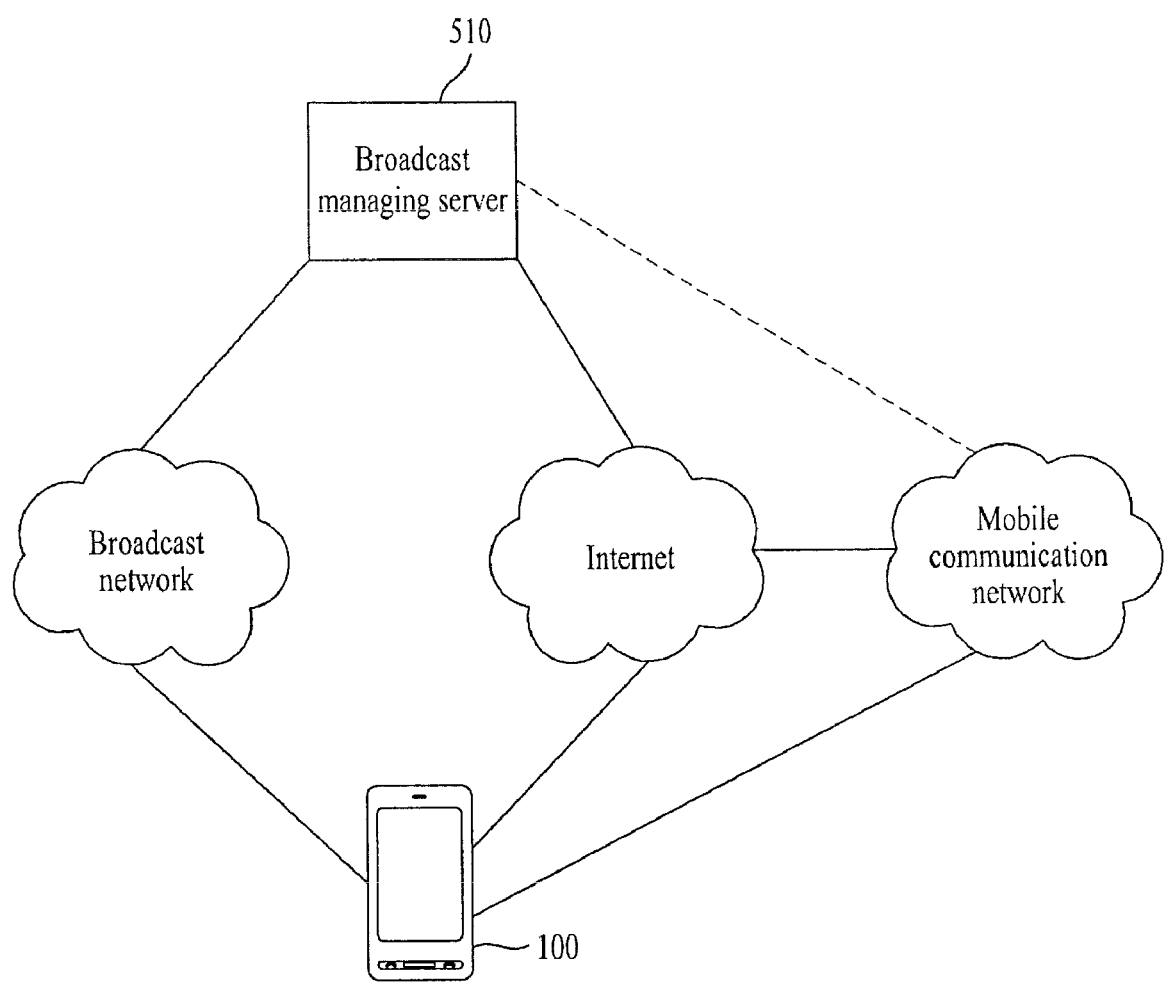
FIG. 5 is a structural diagram of a broadcast system including a mobile terminal according to one example embodiment of the present disclosure.

FIG. 5 is a structural diagram of a broadcast system including a mobile terminal according to one example embodiment of the present disclosure. Other embodiments and configurations are also within the scope of the present disclosure. The mobile terminal 100 may select a specific broadcast mode from a plurality of broadcast modes (e.g. first and second broadcast modes), may receive a broadcast signal corresponding to the selected broadcast mode, and may output the received broadcast signal.

The broadcast mode may be an operational state set in the mobile terminal 100 to receive and output a broadcast signal provided to the mobile terminal 100. Therefore, if a broadcast mode is set, the mobile terminal 100 may perform operations of receiving and outputting a broadcast signal corresponding to the broadcast mode.

The mobile terminal 100 may determine a network for providing a broadcast signal according to the setup broadcast mode. A broadcast mode may be a broadcast mode for receiving and outputting a broadcast signal provided on a broadcast network. A streaming mode (or a unicast mode) may be a broadcast mode for receiving and outputting a broadcast signal provided on the Internet (or a wireless Internet).

The broadcast signal provided on the Internet (or the wireless Internet) may be provided to the mobile terminal 100 via a mobile communication network. This may enable the mobile terminal 100, for which the Internet is not supported, to receive and output a broadcast signal corresponding to a streaming mode.

For example, in case of setting a broadcast mode to a broadcast mode, the mobile terminal 100 may determine a broadcast network as a broadcast signal providing network and may receive a broadcast signal provided on the broadcast network.

In case of setting a broadcast mode to a streaming mode, the mobile terminal 100 may receive a broadcast signal provided on the Internet by determining the Internet as a broadcast signal providing network. The mobile terminal 100 may also determine a mobile communication network as a broadcast signal providing network and may then receive a broadcast signal provided on the Internet via the mobile communication network.

In case that a broadcast signal is provided through various networks in addition to a broadcast network or the Internet, a broadcast mode may be set to various modes in addition to a broadcast mode or a streaming mode.

FIG. 5 shows a broadcast managing server 510. The broadcast managing server 510 may be a server that provides a broadcast signal and/or broadcast relevant information (e.g., EPG, ESG, etc.) to the mobile terminal 100. Further, the broadcast managing server 510 may provide video on demand service to the mobile communication network.

The broadcast managing server 510 may operate irrespective of a broadcast network, as shown in FIG. 5. Alternatively, the broadcast managing server 510 may be individually operated per broadcast network. The broadcast signal and the broadcast relevant information may be provided by one broadcast managing server 510 or may be provided by different broadcast managing servers, respectively.

Figure 6:
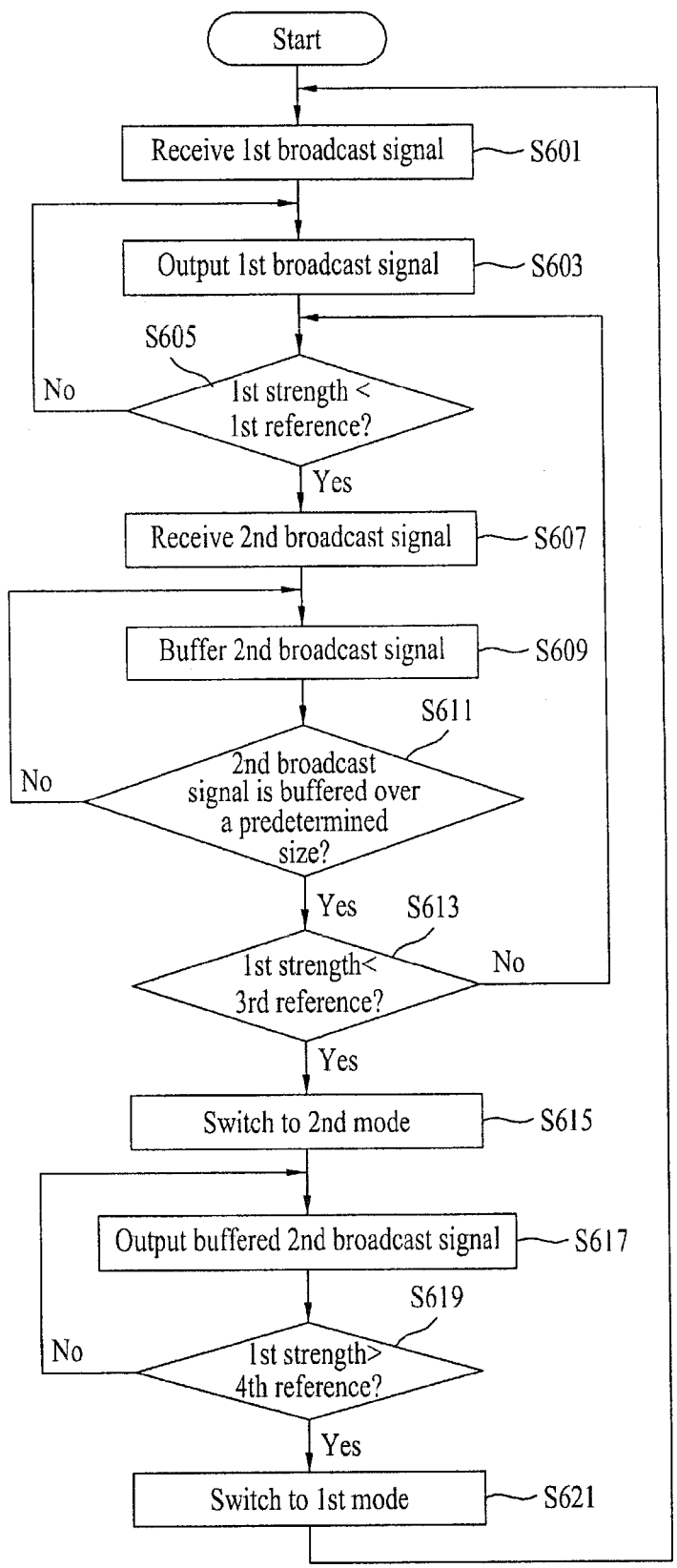
FIG. 6 is a flowchart of a method of controlling a broadcast in mobile terminal according to one example embodiment of the present disclosure.

FIG. 6 is a flowchart of a method of controlling a broadcast in a mobile terminal according to one example embodiment of the present disclosure. Other embodiments, operations and orders of operation are also within the scope of the present disclosure. The mobile terminal 100 may set a specific one of a plurality of available broadcast modes (e.g. first and second broadcast modes) to a reference broadcast mode before the operations shown in FIG. 6 are performed. The plurality of the available broadcast modes may include a broadcast mode and a streaming mode. The mobile terminal 100 may set a broadcast mode that was specified in advance by a terminal manufacturer or a broadcast service provider, to a reference broadcast mode.

The mobile terminal 100 may also set up a reference broadcast mode according to a user's selection, a signal strength per broadcast mode, a presence or non-presence at a specific place, whether to belong to a specific time zone, and/or the like. A timing point of setting a reference broadcast mode may correspond to a timing point before or after a broadcast mode entry.

For example, if a first broadcast mode is selected as a reference broadcast mode by a user through a menu search, the mobile terminal 100 may set the selected first broadcast mode to a reference broadcast mode.

The mobile terminal 100 may also measure a signal strength per broadcast mode before a reference broadcast mode setting and may then set a broadcast mode, of which measured signal strength is good, to a reference broadcast mode.

If a specific broadcast mode is designated to be set to a reference broadcast mode when the mobile terminal 100 is located at a specific place by a user, and if the mobile terminal 100 is determined as located at the specific place, the mobile terminal 100 may set a specific broadcast mode to a reference broadcast mode.

If a specific broadcast mode is designated to be set to a reference broadcast mode when the mobile terminal 100 is made to belong to a specific time zone by a user, and if the mobile terminal 100 is determined as belonging to the specific time zone, the mobile terminal 100 may set a specific broadcast mode to a reference broadcast mode.

The mobile terminal 100 may also set a currently used broadcast mode to a reference broadcast mode. The reference broadcast mode may not be fixed. If the currently used broadcast mode is changed, the reference broadcast mode may be changed together with the changed broadcast mode.

The mobile terminal 100 may perform operations of reception and output of a broadcast signal corresponding to a reference broadcast mode and may perform a broadcast mode switching operation (described below) with reference to signal strength of the broadcast signal corresponding to the reference broadcast mode.

The broadcast signal corresponding to the reference broadcast mode may be a broadcast signal received on a broadcast signal providing network that supports the reference broadcast mode. For example, if the reference broadcast mode is a broadcast mode, a broadcast signal corresponding to the broadcast mode may be a broadcast signal provided on a broadcast network.

In the following, for ease of description a first broadcast mode is assumed to be set as a reference broadcast mode. If a currently used broadcast mode is set to a reference broadcast mode, a first broadcast mode can be assumed as a currently used mode. The mobile terminal 100 may selectively use a first broadcast mode or a second broadcast mode.

As shown in FIG. 6, the mobile terminal 100 may receive, in operation S601, a broadcast signal (hereafter called a first broadcast signal) corresponding to a first broadcast mode, which is a reference broadcast mode, via the wireless communication unit 110.

For example, if the first broadcast mode is a broadcast mode, the mobile terminal 100 may receive a broadcast signal provided on a broadcast network using the broadcast receiving module 111 under control of the controller 180. If the first broadcast mode is a streaming mode, the mobile terminal 100 may receive a broadcast signal via a mobile communication network using the mobile communication module 112 or the wireless Internet module 113 under control of the controller 180.

The mobile terminal 100 may output, in operation S603, the received first broadcast signal using the output unit 150 under control of the controller 180.

The controller 180 may buffer the received first broadcast signal in the memory 160 prior to outputting the first broadcast signal in operation S603. In case of determining that the first broadcast signal has been buffered over a predetermined size, the controller 180 may perform the operation S603. In so doing, the controller 180 may keep receiving and buffering the first broadcast signal while outputting the buffered first broadcast signal. For example, the predetermined size may not be a size enough to stop outputting the first broadcast signal as the previously buffered first broadcast signal fails to exist in course of outputting the buffered first broadcast signal.

A video signal and an audio signal that construct the first broadcast signal, can be outputted via the display 151 and the audio output module 152, respectively.

The mobile terminal 100 may measure a signal strength (hereafter called a first strength) of the first broadcast signal in performing the receiving and outputting operations S601 and S603 and may then determine, in operation S605, whether the measured first strength is less than a first reference under control of the controller 180. In certain instances, the signal strength may be reflective of error rate, e.g., high signal strength may correspond to low error rate and low signal strength may correspond to high error rate.

As a result of the determination in operation S605, if the first strength is determined to be less than the first reference, the mobile terminal 100 may receive, in operation S607, a broadcast signal (hereafter a second broadcast signal) corresponding to a second broadcast mode under control of the controller 180.

The second broadcast mode may be a broadcast mode different from the first broadcast mode and may include either a broadcast mode or a streaming mode. For example, if the first broadcast mode is the broadcast mode, second broadcast mode can become the streaming mode.

If the second broadcast mode is the streaming mode, the mobile terminal 100 may receive, in operation S607, the second broadcast signal provided via the mobile communication network from the Internet using the mobile communication module 112 or may directly receive, in operation S607, the second broadcast signal provided from the Internet using the second broadcast signal.

The second broadcast signal may be included in the same broadcast content of a broadcast content (or a broadcast program) including the first broadcast signal but may only differ from the first broadcast signal in a broadcast signal providing network. The second broadcast signal may configure another part continuous with a part corresponding to the first broadcast signal in the same broadcast content.

For example, the same broadcast channel may be usable for the first and second broadcast modes. The same broadcast channel may provide the same broadcast content in a same time. The first and second broadcast modes may provide the same broadcast content through different broadcast channels, respectively. In this case, the same broadcast channel may mean that broadcast channel identification information (e.g., channel number) is the same.

Further, if the first broadcast mode is switched to the second broadcast mode (and the first broadcast channel is available) in the course of outputting a broadcast content (hereafter a first broadcast content) provided on a first broadcast channel, the mobile terminal 100 may provide the first broadcast content to a user under control of the controller 180.

In the receiving operation S607, the mobile terminal 100 may receive the second broadcast signal using channel access information per broadcast mode.

Channel access information may now be explained in detail. In certain countries or unions, the channel access information may be required to be received prior to reception on various channels. Presently, the United States does not have this requirement.

Channel access information per broadcast mode may be access information to a broadcast channel for receiving a broadcast signal from a broadcast channel available in a corresponding broadcast mode. The channel access information per broadcast mode may include access information to a broadcast channel providing the same broadcast content in other broadcast mode for each broadcast channel available in a corresponding broadcast mode.

The channel access information may be included in broadcast relevant information provided to the mobile terminal 100 by the broadcast managing server 510 (or a separate server). The broadcast relevant information may be the information on a broadcast content or channel provided by the broadcast managing server 510 and may include broadcast time information, broadcast content/channel identification information, broadcast content synopsis, broadcast content performer information, etc. For example, the broadcast relevant information may include an electronic service guide (ESG), an electronic program guide (EPG), a service guide (SG), etc.

The channel access information may be contained in a specific region (e.g., access fragment) of the broadcast relevant information. For example, if a broadcast mode is a broadcast mode, the channel access information may include service description table information. If a broadcast mode is a streaming mode, the channel access information may include URL information.

The channel access information or the broadcast relevant information including the channel access information therein may be received with a predetermined period (e.g., 1 hour, a day, a week, etc.) or may be received according to a request made by the mobile terminal 100. The channel access information or the broadcast relevant information including the channel access information therein may be provided for all broadcast channels or may be provided for a specific broadcast channel requested by the mobile terminal 100.

If the mobile terminal 100 supports a plurality of broadcast modes, channel access information on each of a plurality of the broadcast modes may be provided by being included in one broadcast relevant information or each corresponding broadcast relevant information.

In this example, the former case may mean that channel access information on all broadcast modes is being provided by being included in integrated broadcast relevant information. The latter case may mean channel access information per broadcast mode may be provided by being individually included in broadcast relevant information per broadcast mode.

For example, in the former case, channel access information per broadcast mode may be included in integrated broadcast relevant information by being discriminated from each other. Each channel access information per broadcast mode may include access information to a broadcast channel of another broadcast mode that provides the same broadcast content for each broadcast channel available for a corresponding broadcast mode. Examples of the access information may include broadcast channel access information itself, location information of broadcast channel access information within channel access information in another broadcast mode, channel identifier shared by broadcast channels providing the same content, and/or etc.

In the latter case, broadcast relevant information may be provided per broadcast mode. Corresponding channel access information may be included in broadcast relevant information corresponding to each broadcast mode. In this example, the information of a broadcast channel of another broadcast mode included in each channel access information per broadcast mode may include identification information of broadcast relevant information of another broadcast mode in addition to the above description.

Channel access information may be provided on a current broadcast signal providing network or a separate network different from the broadcast signal providing network. Channel access information may be provided by being included in broadcast relevant information. Channel access information may be provided by being downloaded from a channel access information providing server directly accessed via the Internet (or a wireless Internet). Channel access information may be provided by being received from a correspondent terminal via a mobile communication network or a short-range communication network. Channel access information may be provided by being directly inputted by a user.

As shown in FIG. 6, the channel access information can be previously stored in the memory 160 prior to the receiving operation S607. The channel access information may also be received from the broadcast managing server 510 according to a request made by the mobile terminal 100.

In the former case, the controller 180 may extract access information to a broadcast channel (hereafter called a second broadcast channel) in a second broadcast mode for providing the same broadcast content of a currently outputted broadcast content and then using the extracted access information.

The latter case may be explained as follows. If the first strength is less than the second reference, then the controller 180 may make a request for channel access information per broadcast mode via the wireless communication unit 110. According to a result of the request, the controller 180 may receive the channel access information per broadcast mode.

The channel access information received according to the result of the request may include access information to the second broadcast channel that provides the same broadcast content of the currently outputted broadcast content. The second reference may be equal to or greater than the first reference.

For example, in the requesting process, the controller 180 may transmit identification information or version information of the previously received and stored channel access information (or broadcast relevant information including the channel access information) to the broadcast managing server 510 to enable channel access information corresponding to the transmitted identification or version information to be received. In case of making a request for partial channel access information on a currently used broadcast channel, the controller 180 may transmit broadcast channel identification information in addition to the above identification or version information to enable partial channel access information including access information to a corresponding broadcast channel to be received.

The controller 180 may compare the channel access information received according to the request result to the other channel access information previously stored in the memory 160 and may then update the previously stored channel access information with reference to the received channel access information.

A process for receiving the second broadcast signal using the channel access information in the receiving operation S607 may now be explained.

In case of determining that the first strength is less than the first reference in the course of outputting the first broadcast signal, the controller 180 may access a second broadcast channel via the wireless communication unit 110 using access information to the second broadcast channel that provides the same broadcast content of the broadcast content including the first broadcast signal. For example, in case that a second broadcast mode is a streaming mode, the controller 180 may use the mobile communication module 112 or the wireless Internet module 113.

The controller 180 may access the second broadcast channel and may then receive the second broadcast signal included in the same broadcast content of the broadcast content including the first broadcast signal.

The mobile terminal 100 may buffer, in operation S609, the second broadcast signal received in the receiving operation 5607 and then store the buffered second broadcast signal in the memory 160 under control of the controller 180.

The mobile terminal 100 may receive and buffer both of the first and second broadcast signals but may output the first broadcast signal only under control of the controller 180.

In case of determining that the second broadcast signal has been buffered over a predetermined size, the mobile terminal 100 may determine, in operation 5613, whether the first strength is less than a third reference, under control of the controller 180. The third reference may be equal to or less than the first reference.

When the determination operation S613, determines that the first strength is less than the third reference, the mobile terminal 100 may end the first broadcast mode and then switch, in operation S615, to a second broadcast mode under control of the controller 180.

Alternatively, without determining whether the first strength is less than the third reference, if the second broadcast signal has been buffered over a predetermined size, the controller 180 may directly enter the second broadcast mode.

Alternatively, irrespective of the buffered size of the second broadcast signal, in case of determining that the first strength is less than the third reference, the controller 180 may directly enter the second broadcast mode. In particular, even if the second broadcast signal fails to be buffered over the predetermined size, if the first strength is less than the third reference, the controller 180 may directly enter the second broadcast mode.

Prior to performing the switching operation S615, the first broadcast signal receiving and outputting operations S601 and S603 may keep being performed.

FIGS. 7 to 9B are diagrams of screen configurations until a second broadcast mode is entered in a course of outputting a first broadcast signal according to one example embodiment of the present disclosure.

Figure 7:
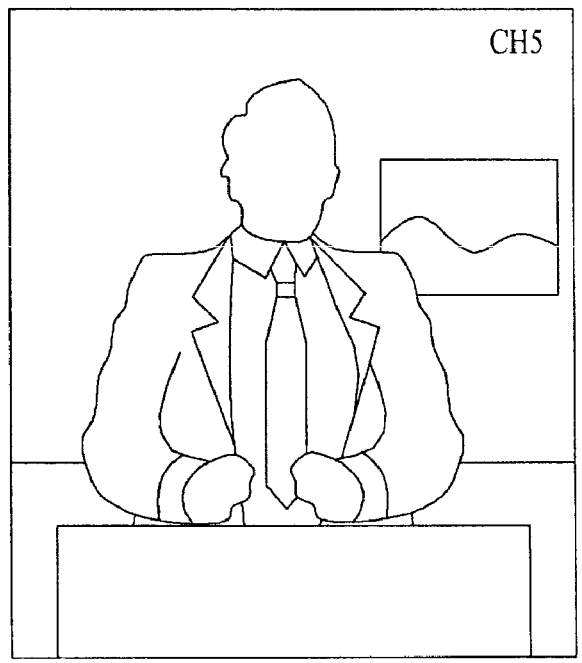
FIGS. 7 to 9B are diagrams of screen configurations until a second broadcast mode is entered in a course of outputting a first broadcast signal according to one example embodiment of the present disclosure.
Figure 8:
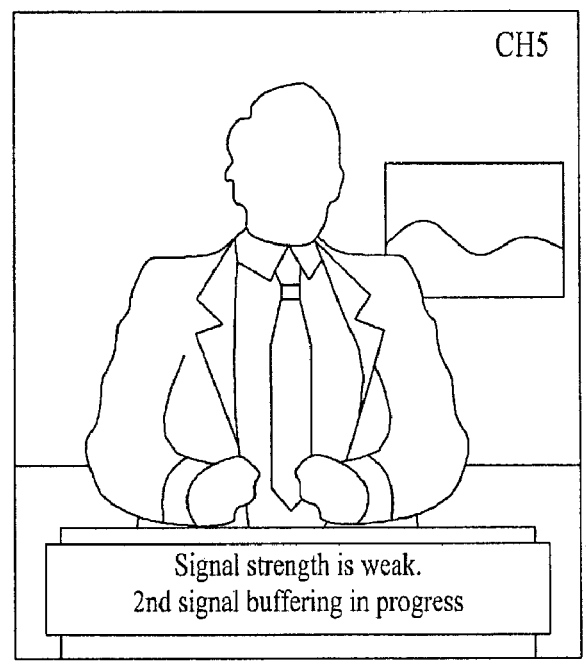

In determining that the first strength is less than the first reference in the course of outputting the first broadcast signal such as in FIG. 7, since the first strength is weak, the mobile terminal 100 may inform a user that the second broadcast signal is received and buffered, while an output of the first broadcast signal is maintained as shown in FIG. 8. For example, the user may be informed using a text, a sound, an icon and/or the like.

Figure 9A:
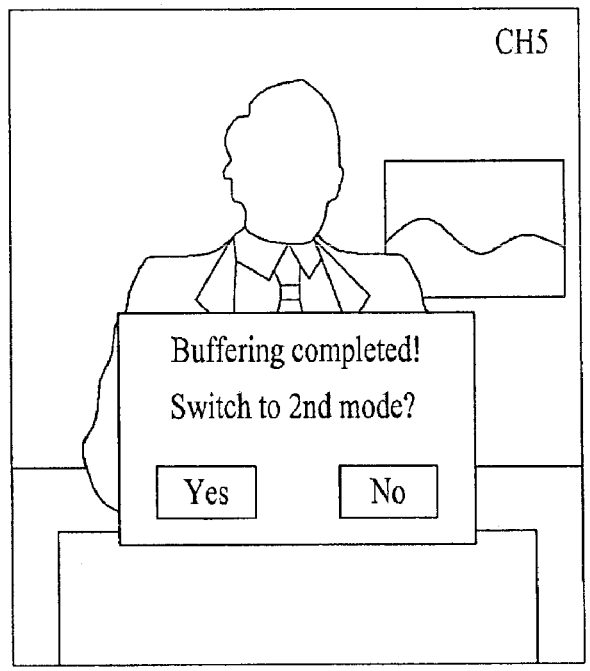
Figure 9B:
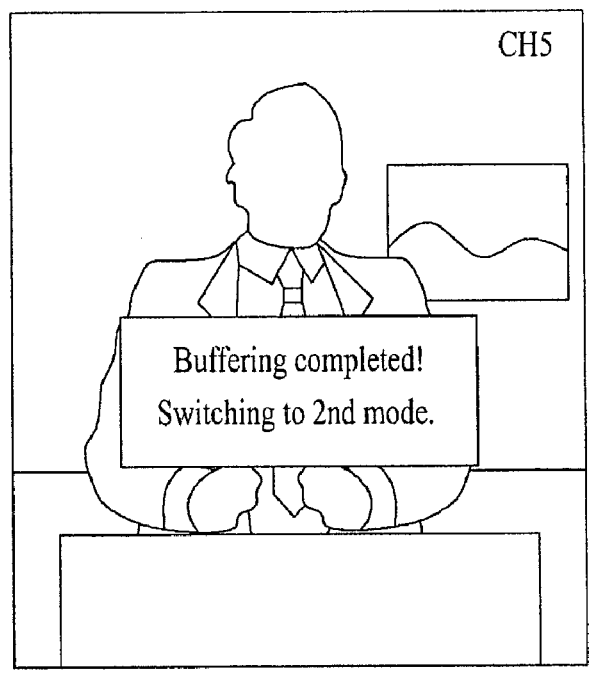

In determining that the second broadcast signal has been buffered over a predetermined size, the mobile terminal 100 may enable a user to select whether a switching to the second broadcast is performed while announcing the buffering completion such as shown in FIG. 9A. Alternatively, the mobile terminal 100 may inform a user that the second mode is automatically entered while announcing the buffering completion such as shown in FIG. 9B.

The mobile terminal 100 may enter the second broadcast mode and then output the buffered second broadcast signal to seamlessly provide the user with the same broadcast content.

In switching to the second mode in operation S615 (FIG. 6), the mobile terminal 100 may output, in operation S617, the second broadcast signal having been buffered in the buffering operation S609 through the output unit 150 under control of the controller 180.

In performing the outputting operation S617, the mobile terminal 100 may measure the first strength periodically or randomly and then determine, in operation S619, whether the measured first strength exceeds a fourth reference. The fourth reference may be equal to or greater than the first reference.

As a result of the determination operation 5619, if the first strength exceeds the fourth reference, the mobile terminal 100 may end the second broadcast mode and then switch, in operation S621, to the first broadcast mode, under control of the controller 180.

Meanwhile, in case that a currently used broadcast mode is set to a reference broadcast mode, as the second broadcast mode is entered, the mobile terminal 100 may set the second broadcast mode to the reference broadcast mode.

Therefore, the mobile terminal 100 may compare the second strength of the second broadcast mode, which is the changed reference broadcast mode, to each of the first to third references and then determine a first broadcast signal reception, a channel access information request and reception, and whether to switch to the first broadcast mode.

The mobile terminal 100 may receive and buffer the first broadcast signal prior to performing the switching operation S621. In case of determining that the buffered first broadcast signal exceeds over a predetermined size, the mobile terminal 100 may perform the switching operation S621. This may provide a user with a seamless broadcast content.

As discussed in the foregoing, the first broadcast signal may be a broadcast signal from a broadcast channel of the first broadcast mode that provides the same broadcast content as a broadcast content including the second broadcast signal. The first broadcast signal may configure another part continuous with a part corresponding to the second broadcast signal in the same broadcast content.

Screen configurations until switching of a first broadcast mode in a course of outputting a second broadcast signal may now be explained with reference to FIGS. 10 to 11B.

Figure 10:
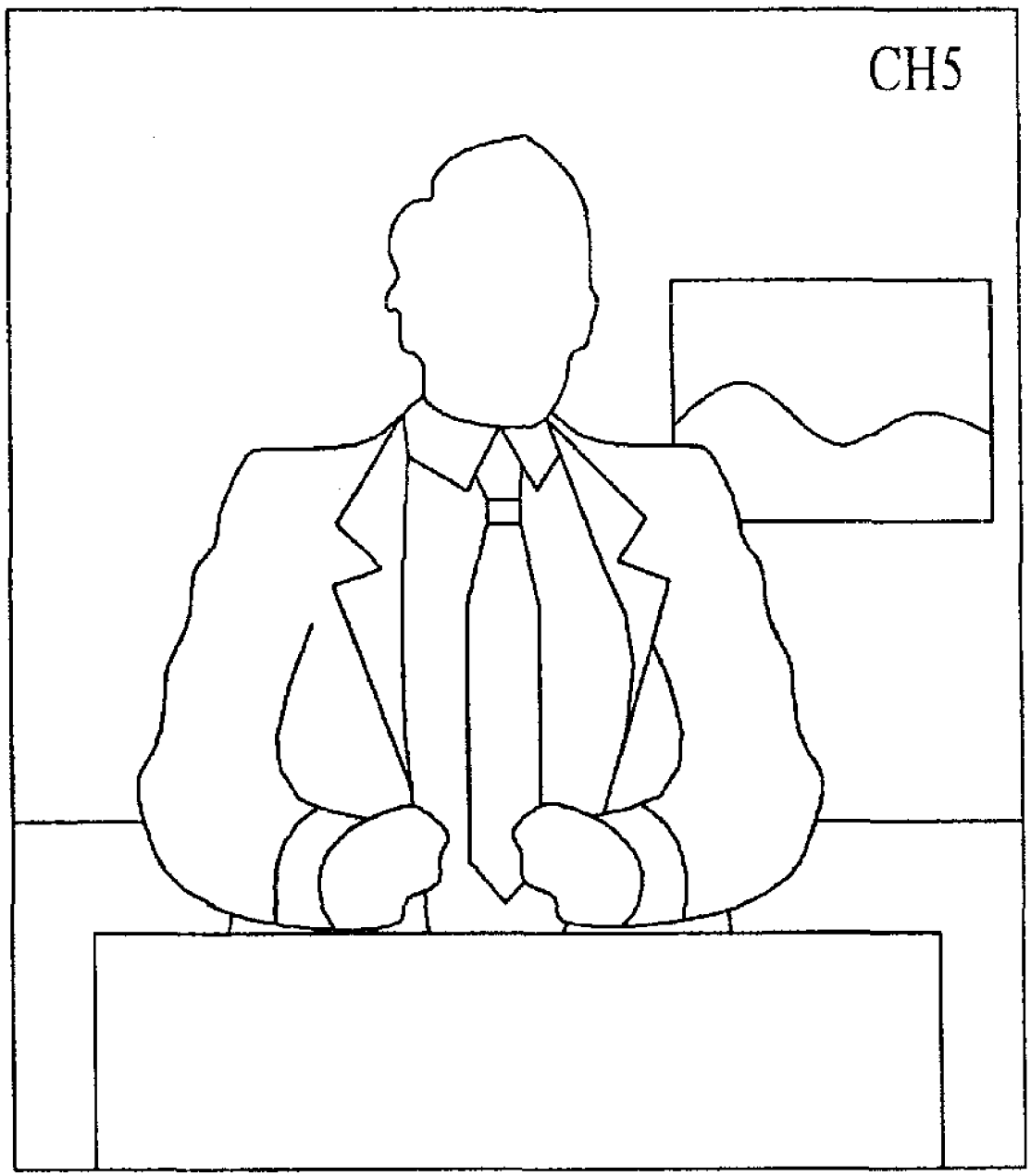
FIGS. 10 to 11B are diagrams of screen configurations until a first broadcast mode is entered in a course of outputting a second broadcast signal according to one example embodiment of the present disclosure.
Figure 11A:
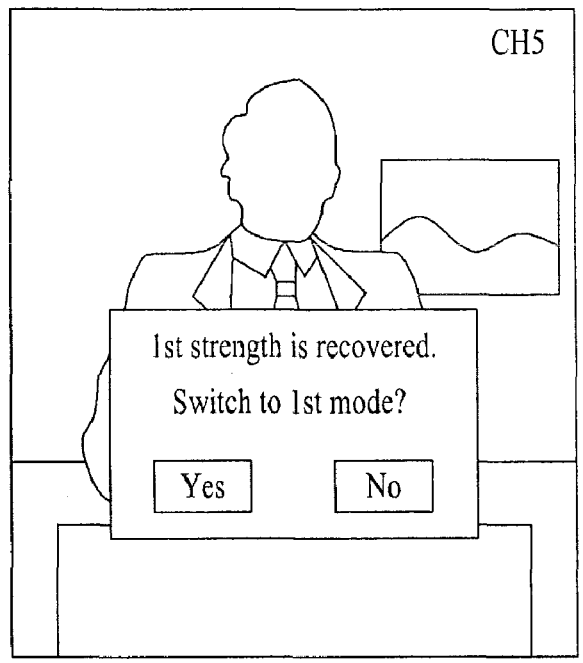
Figure 11B:
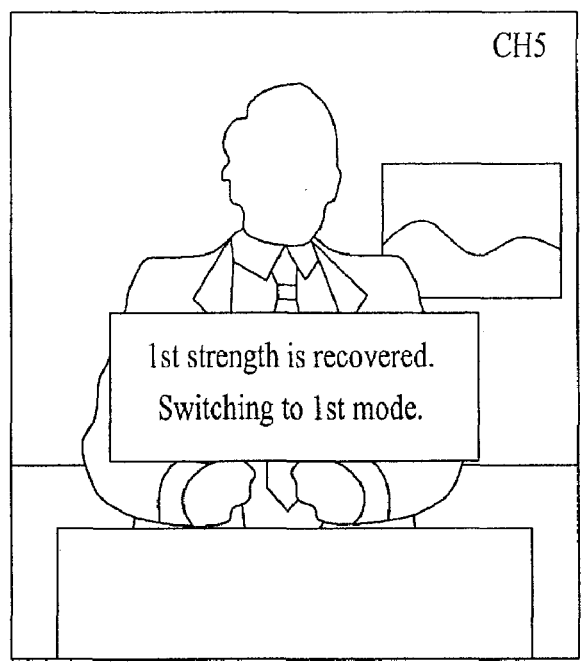

FIGS. 10 to 11B are diagrams of screen configurations until a first broadcast mode is entered in a course of outputting a second broadcast signal according to one example embodiment of the present disclosure.

In determining that the first strength exceeds the fourth reference in course of outputting the second broadcast signal such as in FIG. 10, the mobile terminal 100 may enable a user to select whether to switch to the first broadcast mode while announcing that the first strength has been recovered such as in FIG. 11A. Alternatively, the mobile terminal 100 may inform a user that the first broadcast mode is automatically entered while announcing that the first strength has been recovered such as shown in FIG. 11B.

The mobile terminal 100 may return to the first broadcast mode as the reference broadcast mode and then output the first broadcast signal.

Figure 12:
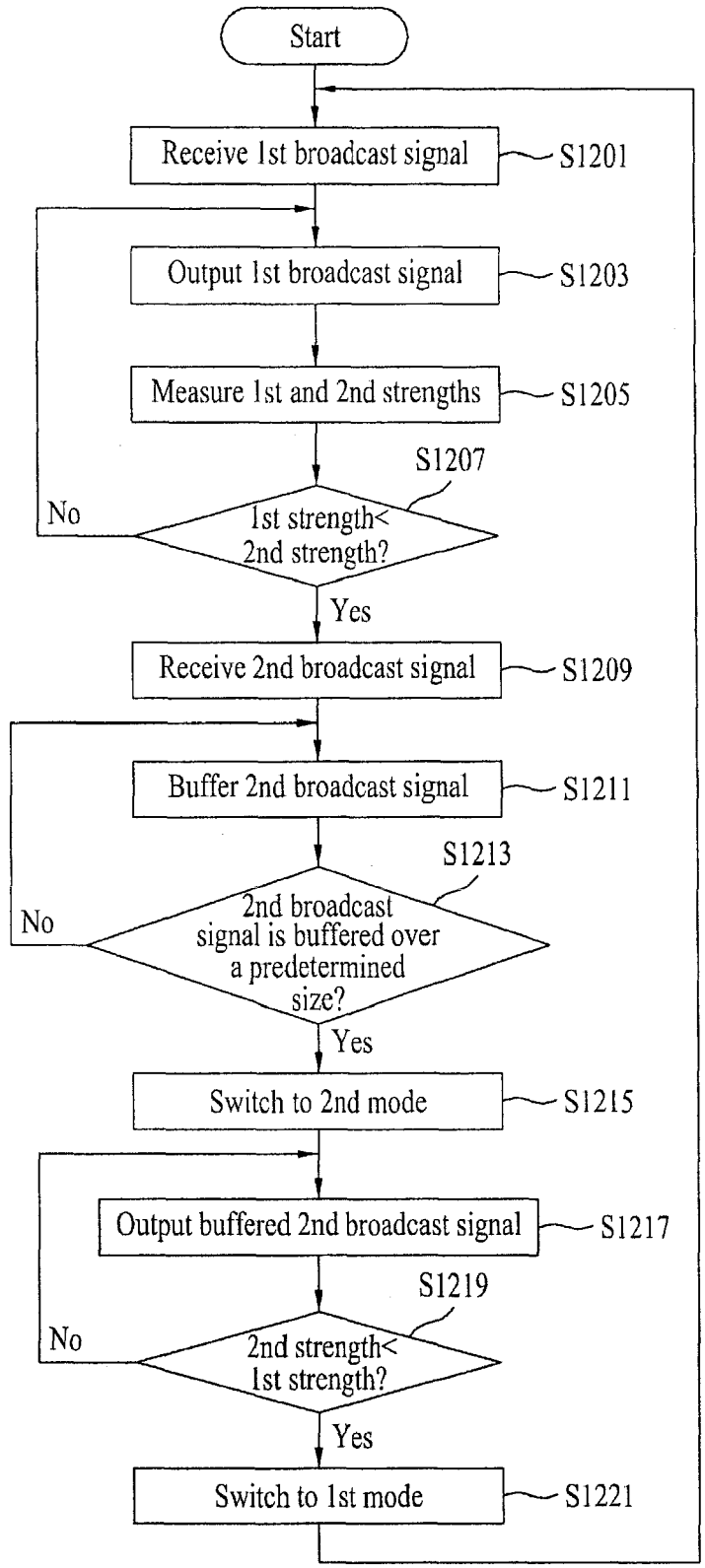
FIG. 12 is a flowchart of a method of controlling a broadcast in mobile terminal according to one example embodiment of the present disclosure.

FIG. 12 is a flowchart of a method of controlling a broadcast in mobile terminal according to one example embodiment of the present disclosure. Other embodiments, operations and orders of operation are also within the scope of the present disclosure.

In FIG. 12, the mobile terminal 100 may determine whether to maintain a currently used broadcast mode or to switch to a different broadcast mode with reference to a difference between a broadcast signal strength of the currently used broadcast mode and a broadcast signal strength of the different broadcast mode. A plurality of settable broadcast modes may include a broadcast mode and a streaming mode.

For ease of description, it is assumed that the mobile terminal 100 is currently using a first broadcast mode, and it is assumed that a first broadcast mode or a second broadcast mode may be selectively usable.

As shown in FIG. 12, the mobile terminal 100 may receive, in operation S1201, a broadcast signal (hereafter a first broadcast signal) corresponding to a first broadcast mode. The broadcast signal may be output in operation S1203.

The receiving and outputting operations S1201 and S1203 shown in FIG. 12 may be similar to operations S601 and S603 in FIG. 6 and as such further details may be omitted.

The mobile terminal 100 may measure, in operation S1205, a signal strength (hereafter called a first strength) of the first broadcast signal and a signal strength of a broadcast signal (hereafter called a second broadcast signal) corresponding to a second broadcast mode in correspondence to the first broadcast signal in course of performing the receiving and outputting operations S1201 and S1203 under control of the controller 180.

Assuming that the second broadcast mode is a streaming mode, the controller 180 may measure an Internet access strength (when the mobile terminal 100 is directly connected to the Internet) or a call signal strength (when the mobile terminal 100 is connected to the Internet via a mobile communication network) as a second strength. Alternatively, assuming that the second broadcast mode is a broadcast mode, the controller 180 may access a broadcast network and then measure a broadcast signal strength as a second strength.

The mobile terminal 100 may determine, in operation S1207, whether the second strength is greater than the first strength under control of the controller 180. As a result of this determination, if the second strength is determined to be greater than the first strength, the mobile terminal 100 may receive, in operation S1209, a broadcast signal (hereafter a second broadcast signal) corresponding to the second broadcast mode under control of the controller 180.

For example, if the second strength is greater than the first strength over a first reference difference with reference to absolute sizes of the first and second strengths, the controller 180 may receive the second broadcast signal. If the first strength is greater than the first reference difference, the controller 180 may not receive the second broadcast signal.

The mobile terminal 100 may buffer, in operation S1211, the second broadcast signal received in the receiving operation S1209 and then store the buffered second broadcast signal in the memory 160 under control of the controller 180.

The receiving and buffering operations S1209 and S1211 shown in FIG. 12 may be similar to operations S607 and S609 shown in FIG. 6 and as such further details may be omitted.

For channel access information per broadcast mode, which is used for the receiving operation S1209, the above descriptions may be referred to.

Channel access information may be previously stored in the memory 160 prior to the receiving operation S1209 or may be received from the broadcast managing server 510 according to a request made by the mobile terminal 100.

In the latter case, if the second strength is greater than the first strength over the first reference difference or the second strength is greater than the first reference size, the controller 180 may make a request for channel access information per broadcast mode and may then receive the channel access information per broadcast mode as a result of the request via the wireless communication unit 110.

In determining that the second broadcast signal has been buffered over a predetermined size, the mobile terminal 100 may end the first broadcast mode and then switch, in operation S1215 to a second broadcast mode under control of the controller 180.

As the first strength gets less than a previously measured size or the second strength gets greater than the previously measured size, if the second strength gets greater than the first strength over the first reference difference or the second strength gets greater than the first reference size, the controller 180 may perform the switching operation S1215.

Alternatively, irrespective of the buffered size of the second broadcast signal, if the second strength is greater than the first strength, the controller 180 may switch to the second broadcast mode. This may mean that the second mode can be entered if the second strength is greater than the first strength, despite that the second broadcast signal fails to be buffered over the predetermined size.

Before the switching operation S1215 is performed, the first broadcast signal receiving and outputting operations S1201 and S1203 may keep being performed.

Figure 13A:
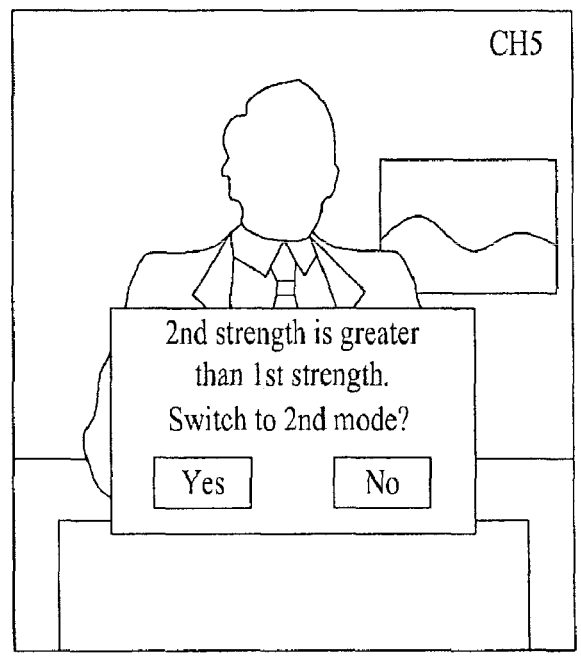
FIG. 13A and FIG. 13B are diagrams of screen configurations until a second broadcast mode is entered in a course of outputting a first broadcast signal according to one example embodiment of the present disclosure.
Figure 13B:
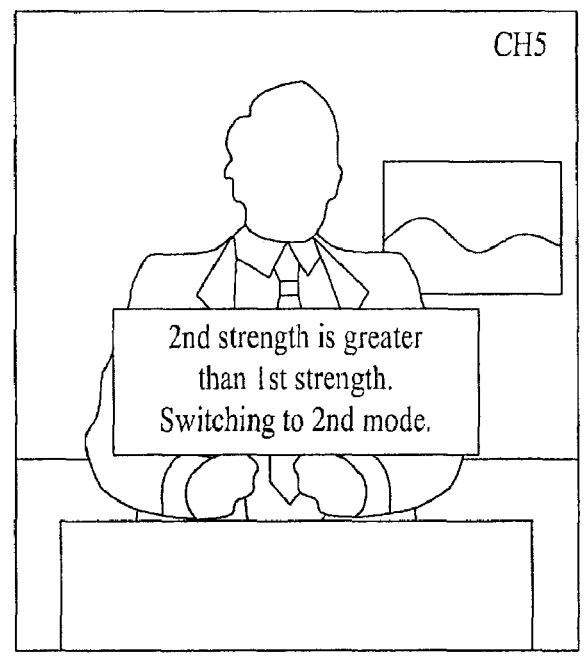

FIG. 13A and FIG. 13B are diagrams of screen configurations until a second broadcast mode is entered in course of outputting a first broadcast signal according to one example embodiment of the present disclosure.

In determining that the second strength is greater than the first strength in course of outputting the first broadcast signal, the mobile terminal 100 may enable a user to select whether to switch to the second broadcast mode while announcing that the second strength is greater such as shown in FIG. 13A. Alternatively, the mobile terminal 100 may inform a user that the second broadcast mode is automatically entered while announcing that the second strength is greater such as shown in FIG. 13B.

Therefore, despite switching to the second broadcast mode, the mobile terminal 100 may seamlessly provide the user with the same broadcast content.

Referring to FIG. 12, in case of switching to the second broadcast mode in operation S1215, the mobile terminal 100 may output, in operation S1217, the second broadcast signal having been buffered in the buffering operation S1211 via the output unit under control of the controller 180.

The mobile terminal 100 may perform the measuring operation S1205 periodically or randomly in course of the outputting operation S1217 under control of the controller 180.

As a result of measuring the first and second strengths in course of outputting the second broadcast signal, the mobile terminal 100 may determine, in operation S1219 whether the first strength is greater than the second strength. In the determining operation S1219, the mobile terminal 100 may make the determination with reference to relative and absolute sizes of the first and second strengths.

As a result of the determination, in determining that the first strength is greater than the second strength, the mobile terminal 100 may end the second broadcast mode and then switch to the first broadcast mode in operation S1221 under control of the controller 180.

The mobile terminal 100 may receive and buffer the first broadcast signal before the switching operation S1221. In determining that the buffered first broadcast signal exceeds a predetermined size, the mobile terminal 100 may perform the switching operation S1221. This may seamlessly provide a broadcast content to a user.

The second broadcast signal in correspondence to the first broadcast signal may not be found in course of outputting the first broadcast signal. A broadcast channel for providing the same content of a broadcast content including the first broadcast signal may not be supported by the second broadcast mode.

Consequently, despite attempting a reception of the second broadcast signal when the first strength is less than the first reference, the mobile terminal 100 may be unable to receive the second broadcast signal due to absence of the second broadcast signal.

Figure 14A:
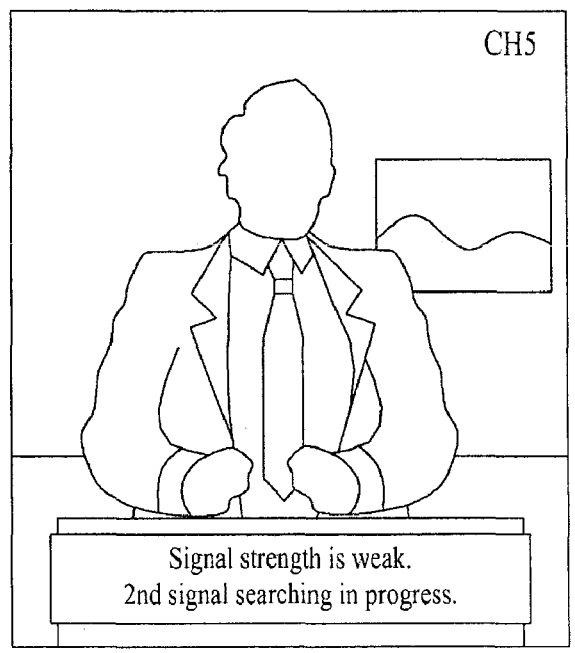
FIG. 14A and FIG. 14B are diagrams of screen configurations in case that a second broadcast signal corresponding to a first signal is not searched in a course of outputting the first broadcast signal according to one example embodiment of the present disclosure.
Figure 14B:
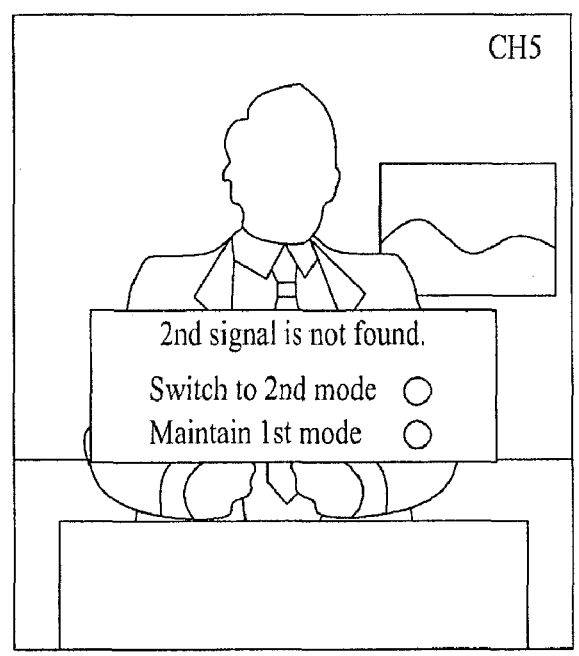

In this example, according to a selection made by a user, the mobile terminal 100 may switch to the second broadcast mode or may maintain the first broadcast mode such as shown in FIG. 14A and FIG. 14B.

If the switching to the second broadcast mode is selected, the mobile terminal 100 may switch to the second broadcast mode and then output a broadcast content provided on a random broadcast channel supported in the second broadcast mode.

The above-described broadcast controlling methods may be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and may also include carrier-wave type implementations (e.g., transmission via Internet).

Embodiments of the present disclosure may provide effects and/or advantages. In case that a signal strength of a current used broadcast mode becomes poor, a broadcast signal corresponding to another broadcast mode may be buffered. Embodiments of the present disclosure may seamlessly provide a currently viewed broadcast content to a user even if another broadcast mode is entered.

In case that a signal strength of another broadcast mode becomes good, a broadcast signal corresponding to another broadcast mode may be buffered. Embodiments of the present disclosure may seamlessly provide a currently viewed broadcast content to a user using a broadcast mode having a good signal strength even if another broadcast mode is entered.

In another embodiment, the channel access information may be downloaded by a second communication module when the signal strength of the signal received by the first communication module has reached a first prescribed level. However, buffering of information received by the second communication module does not occur until the signal strength of the signal received by the first communication module has reached a second predetermined level, which is less than the first prescribed level. Thereafter, when the signal strength has reached a third predetermined level, which is lower than the second predetermined level, the information buffered is displayed, and the information received by the second module is used for display.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a memory;
a display;
a wireless communication unit having a first module to receive a first broadcast signal and a second module to receive a second broadcast signal; and
a controller to control the wireless communication unit, wherein when a signal strength of the first broadcast signal received by the first module is less than a first signal strength, the controller to control the second module to receive the second broadcast signal and the second broadcast signal is buffered in the memory while the display displays content corresponding to the first broadcast signal received by the first module,
wherein when the signal strength of the first broadcast signal is less than a second signal strength, the controller controls the wireless communication unit to request channel access information and receives the channel access information based on a result of the request, wherein the second broadcast signal is received using the received channel access information, and wherein the second signal strength is equal to or greater than the first signal strength.

2. The mobile terminal of claim 1, wherein when the signal strength of the first broadcast signal is less than the second signal strength, the display displays content corresponding to the second broadcast signal buffered in the memory.

3. The mobile terminal of claim 1, wherein when buffering of the second broadcast signal is completed, the display displays the content corresponding to the second broadcast signal.

4. The mobile terminal of claim 1, wherein the second broadcast signal includes a same broadcast content as the first broadcast signal.

5. The mobile terminal of claim 4, wherein the second broadcast signal configures another part continuous with a part corresponding to the first broadcast signal in the same broadcast content.

6. The mobile terminal of claim 5, wherein when the signal strength of the first broadcast signal is less than a third signal strength, the controller outputs the buffered second broadcast signal, and wherein the third signal strength is equal to or less than the first signal strength.

7. The mobile terminal of claim 6, wherein the controller determines the signal strength of the first broadcast signal during outputting the buffered second broadcast signal after switching from a first broadcast mode to a second broadcast mode, and wherein when the signal strength of the first broadcast signal is greater than a fourth signal strength, the controller switches to the first broadcast mode from the second broadcast mode.

8. The mobile terminal of claim 7, wherein the controller controls the wireless communication unit to receive the first broadcast signal before switching to the first broadcast mode and the controller buffers the received first broadcast signal, and then outputs the buffered first broadcast signal based on the switching to the first broadcast mode.

9. The mobile terminal of claim 1, further comprising an output unit to output one of a first broadcast signal or a second broadcast signal.

10. The mobile terminal of claim 9, wherein the controller controls the output unit to output the buffered second broadcast signal by switching from a first broadcast mode to a second broadcast mode when the second broadcast signal is buffered to greater than a predetermined size.

11. The mobile terminal of claim 1, wherein the first module comprises a broadcast receiving module to receive the first broadcast signal and the second module comprises a wireless Internet module to receive the second broadcast signal.

12. The mobile terminal of claim 1, wherein the controller controls the wireless communication unit to receive the second broadcast signal using channel access information per broadcast mode.

13. The mobile terminal of claim 12, wherein the channel access information per broadcast mode is previously stored in the memory before reception of the second broadcast signal at the mobile terminal.

14. The mobile terminal of claim 12, wherein the channel access information per broadcast mode is received from a broadcast managing server according to a request made by the mobile terminal before reception of the second broadcast signal at the mobile terminal.

15. The mobile terminal of claim 12, wherein the channel access information per broadcast mode is included in broadcast relevant information provided to the mobile terminal.

16. The mobile terminal of claim 15, wherein channel access information for a first broadcast mode and channel access information for a second broadcast mode are included in one broadcast relevant information or are individually included in each broadcast relevant information.

17. A method of controlling a mobile terminal, the method comprising:
receiving a first broadcast signal;
determining whether a signal strength of the first broadcast signal is less than a second signal strength;
requesting channel access information when the signal strength of the first broadcast signal is less than the second signal strength;
receiving the channel access information based on a result of the request;
determining whether the signal strength of the first broadcast signal is less than a first signal strength; and
receiving a second broadcast signal using the received channel access information and buffering the received second broadcast signal in a memory when the determined signal strength of the first broadcast signal is less than the first signal strength while displaying content corresponding to the first broadcast signal,
wherein the second signal strength is equal to or greater than the first signal strength.

18. The method of claim 17, wherein when the signal strength of the first broadcast signal is less than the second signal strength, content corresponding to the second broadcast signal buffered in the memory is displayed.

19. The method of claim 17, wherein when buffering of the second broadcast signal is completed, content corresponding to the second broadcast signal is displayed.

20. The method of claim 17, wherein the second broadcast signal includes a same broadcast content as the first broadcast signal.

21. The method of claim 20, wherein the second broadcast signal configures another part continuous with a part corresponding to the first broadcast signal in the same broadcast content.

22. The method of claim 17, wherein the buffered second broadcast signal is output by switching from a first broadcast mode to a second broadcast mode when the second broadcast signal is buffered to greater than a predetermined size.

23. The method of claim 17, wherein the second broadcast signal is received using channel access information per broadcast mode.

* * * * *